United States Patent
Zhong

(10) Patent No.: US 11,808,222 B2
(45) Date of Patent: Nov. 7, 2023

(54) CONTROL METHOD AND CONTROL DEVICE FOR INTERNAL COMBUSTION ENGINE

(71) Applicant: NISSAN MOTOR CO., LTD., Yokohama (JP)

(72) Inventor: Peiying Zhong, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/007,735

(22) PCT Filed: Jun. 4, 2020

(86) PCT No.: PCT/IB2020/000548
§ 371 (c)(1),
(2) Date: Dec. 1, 2022

(87) PCT Pub. No.: WO2021/245436
PCT Pub. Date: Dec. 9, 2021

(65) Prior Publication Data
US 2023/0235709 A1    Jul. 27, 2023

(51) Int. Cl.
*F02D 21/08* (2006.01)
*F02D 41/00* (2006.01)

(52) U.S. Cl.
CPC .......... *F02D 21/08* (2013.01); *F02D 41/005* (2013.01); *F02D 41/0052* (2013.01); *F02D 2021/083* (2013.01)

(58) Field of Classification Search
CPC .............. F02D 21/08; F02D 41/0052; F02D 2021/083; F02D 41/005
See application file for complete search history.

(56) References Cited

U.S. PATENT DOCUMENTS

| | | | |
|---|---|---|---|
| 2002/0092293 A1* | 7/2002 | Yasui | F01N 3/0835 60/285 |
| 2004/0187478 A1* | 9/2004 | Tamura | F01N 3/2006 60/284 |
| 2006/0021596 A1 | 2/2006 | Maeda et al. | |

FOREIGN PATENT DOCUMENTS

| JP | S59-128962 A | 7/1984 |
|---|---|---|
| JP | S60-104754 A | 6/1985 |
| JP | H09-14028 A | 1/1997 |
| JP | 2002-130028 A | 5/2002 |
| JP | 2014-177911 A | 9/2014 |

* cited by examiner

*Primary Examiner* — Jacob M Amick
(74) *Attorney, Agent, or Firm* — Foley & Lardner LLP

(57) ABSTRACT

An internal combustion engine (1) includes: an exhaust gas recirculation unit equipped with an exhaust gas recirculation control valve (9); a crank angle sensor (11) that detects an indicated mean effective pressure fluctuation rate (cPi) as an indicator of combustion stability of the internal combustion engine (1); and a controller (10) that corrects the EGR rate of the exhaust gas recirculation unit based on the combustion stability. The controller (10) is configured to: increase-correct the EGR rate by a predetermined amount when the state where the indicated mean effective pressure fluctuation rate (cPi) is lower than a threshold value continues for a predetermined number of cycles; and decrease-correct the EGR rate by a predetermined amount immediately when the indicated mean effective pressure fluctuation rate (cPi) is higher than or equal to the threshold value.

4 Claims, 3 Drawing Sheets

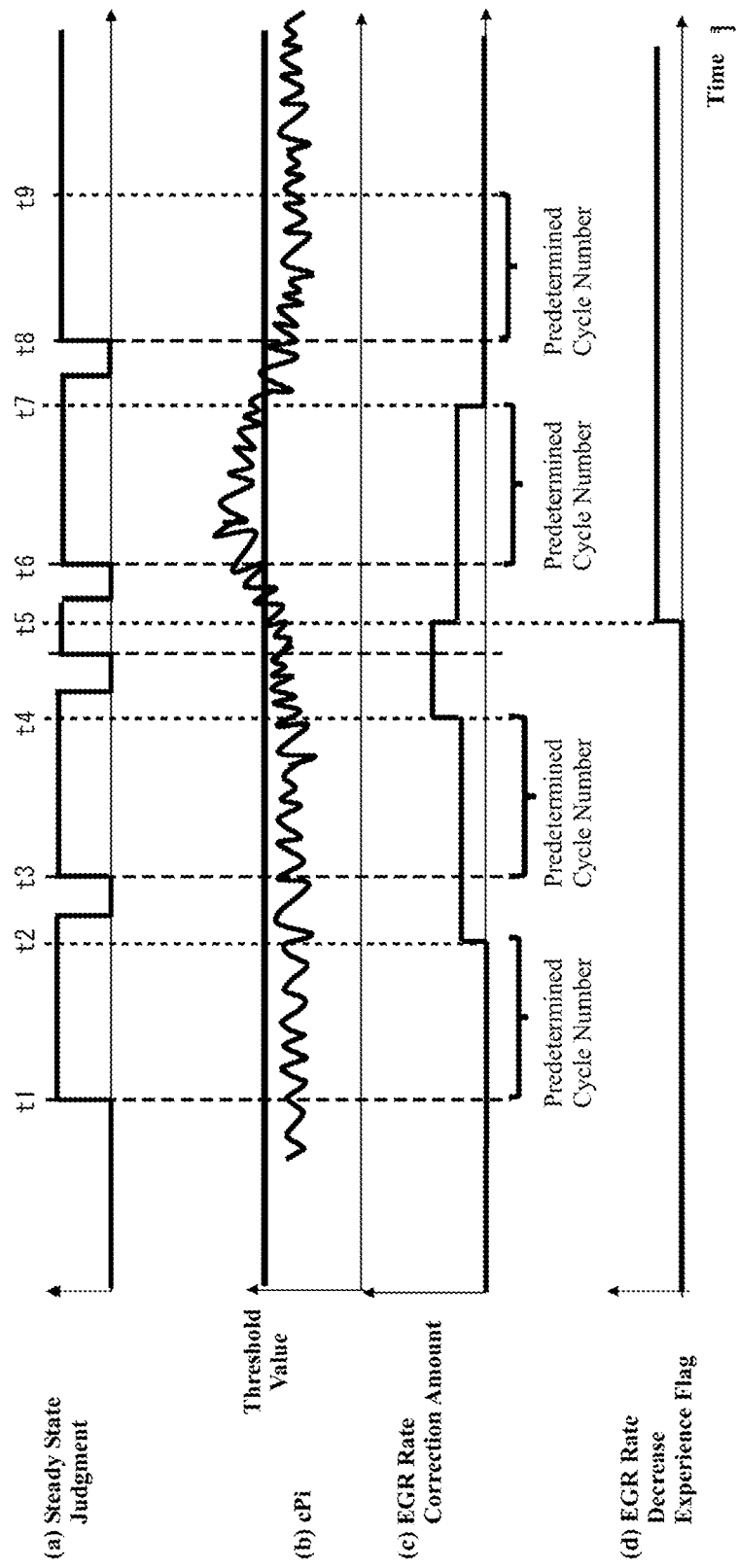

CONTROL METHOD AND CONTROL DEVICE FOR INTERNAL COMBUSTION ENGINE

TECHNICAL FIELD

The present invention relates to a control method and control device for an internal combustion engine, by which the exhaust gas recirculation rate is corrected on the basis of combustion stability.

BACKGROUND ART

There is known an exhaust gas recirculation unit for recirculating a part of exhaust gas from an exhaust system to an intake system of an internal combustion engine. In the exhaust gas recirculation unit, it is advantageous to set the exhaust gas recirculation rate to a higher value for improvements of fuel consumption etc. On the other hand, the combustion stability is lowered as the exhaust gas recirculation rate is increased. In other words, the exhaust gas recirculation rate is limited according to the combustion stability.

Patent Document 1 discloses a technique configured to: detect a torque fluctuation which is correlated with a fluctuation of indicated mean effective pressure; compare the torque fluctuation with a threshold value at every predetermined number of cycles, e.g. at every 16 cycles; when the torque fluctuation is smaller than or equal to the threshold value, increase the exhaust gas recirculation rate by a predetermined amount; and, when the torque fluctuation is greater than the threshold value, decrease the exhaust gas recirculation rate by a predetermined amount.

The above-disclosed conventional control technique however results in an unfavorable situation that, in the case where combustion becomes unstable, the unstable combustion continues until a lapse of the predetermined number of cycles.

PRIOR ART DOCUMENTS

Patent Document

Patent Document 1: Japanese Laid-Open Patent Publication No. S60-104754

SUMMARY OF THE INVENTION

The present invention is directed to a control technique for an internal combustion engine, including obtaining an indicator representing combustion stability of the internal combustion engine and correcting an exhaust gas recirculation rate based on the combustion stability. In the control technique, the exhaust gas recirculation rate is increase-corrected by a predetermined amount at every lapse of a predetermined number of cycles when the combustion stability satisfies a predetermined level; and the exhaust gas recirculation rate is decrease-corrected immediately when the combustion stability is detected as being lower than the predetermined level.

By increase-correcting the exhaust gas recirculation rate by the predetermined amount at every lapse of the predetermined number of cycles, it is possible to increase the exhaust gas recirculation rate to its limit while avoiding sudden deterioration of combustion occurring with a delay after the increase of the exhaust gas recirculation rate. This leads to improvement of fuel consumption.

In the case where the deterioration of combustion is detected, on the other hand, the exhaust gas recirculation rate is immediately corrected to a lower value without waiting for a lapse of the predetermined number of cycles. It is possible by such decrease correction to suppress continuation of the deteriorated combustion state to a minimum.

BRIEF DESCRIPTION OF DRAWINGS

FIG. 3 is a timing chart of operations according to one embodiment of the present invention.

DESCRIPTION OF EMBODIMENTS

Hereinafter, one embodiment of the present invention will be described in detail below with reference to the drawings.

Figure 1:
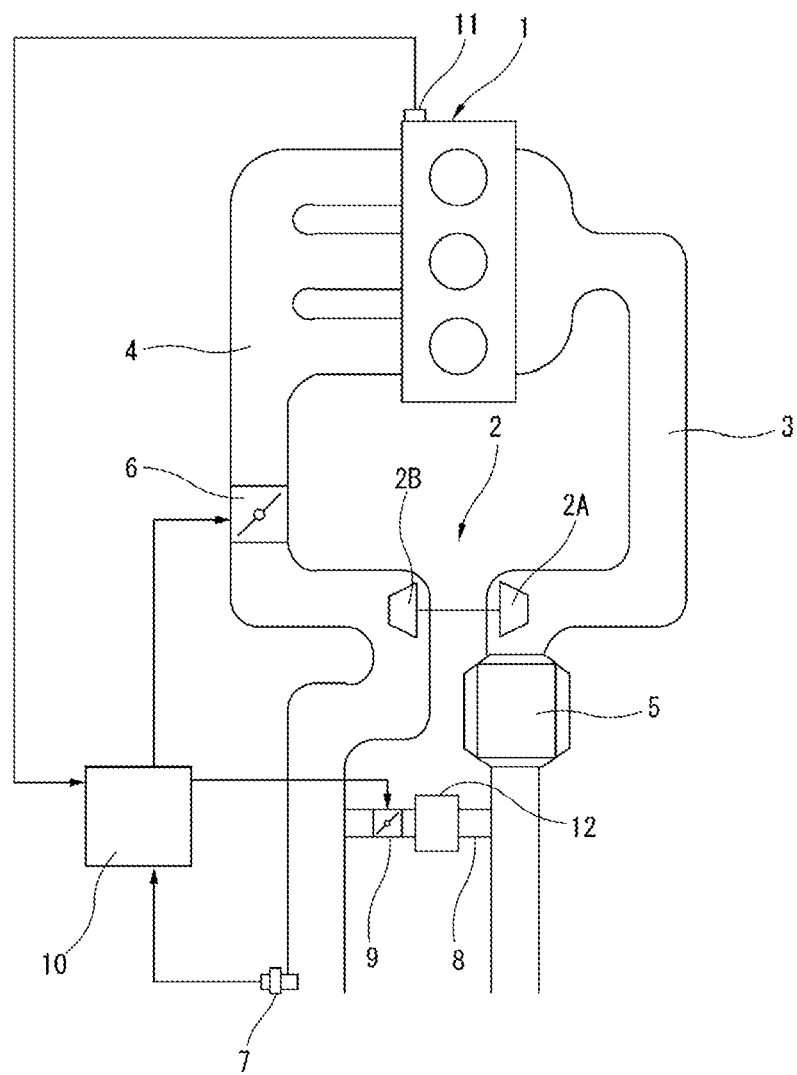
FIG. 1 is a schematic configuration view of an internal combustion engine to which one embodiment of the present invention is applied.

FIG. 1 is a schematic configuration view of an internal combustion engine 1 for a vehicle to which one embodiment of the present invention is applied. The internal combustion engine 1 is, for example, a spark ignition internal combustion engine using gasoline as a fuel and having a turbocharger 2 as a supercharger. More specifically, a turbine 2A of the turbocharger 2 is disposed in an exhaust passage 3 of the internal combustion engine 1; and a compressor 2B of the turbocharger 2, which is driven by the turbine 2A, is disposed in an intake passage 4 of the internal combustion engine 1 so as to be coaxial with the turbine 2A. The turbine 2A is situated at a position upstream of a catalytic converter 5 in the exhaust passage 3. An electronically controlled throttle valve 6 is situated at a position downstream of the compressor 2B in the intake passage 4. An air cleaner (not shown) is disposed in an inlet side of the intake passage 4. An airflow meter 7 for detecting an intake air amount is disposed downstream of the air cleaner in the intake passage.

The internal combustion engine has, as an exhaust gas recirculation unit for recirculating a part of exhaust gas to the intake system, an exhaust gas recirculation passage 8 extending from the exhaust passage 3 to the intake passage 4 and an exhaust gas recirculation control valve 8 disposed in the exhaust gas recirculation passage 8. In the present embodiment, the exhaust gas recirculation passage 8 is branched from a portion of the exhaust passage 3 downstream of the catalytic converter 5. Further, the exhaust gas recirculation passage 8 is joined at a distal end thereof to a portion of the intake passage 4 downstream of the airflow meter 7 and upstream of the compressor 2B. Accordingly, the exhaust gas recirculation unit is configured as a so-called low-pressure EGR type capable of recirculating exhaust gas from the downstream side of the turbine 2A to the upstream side of the compressor 2A which is relatively low in pressure even in a supercharging region of the internal combustion engine 1. An EGR gas cooler 12 for cooling exhaust gas is disposed in the exhaust gas recirculation passage 8 at a position upstream of the exhaust gas recirculation control valve 9.

An engine controller 10 is provided to control the opening of the exhaust gas recirculation control valve 9. Herein, the exhaust gas recirculation control valve 9 can be of any type. The opening of the exhaust gas recirculation control valve 9 is controlled according to the intake air amount detected by the airflow meter 7 etc. so as to achieve a target EGR rate.

Various sensors commonly required for control of the internal combustion engine 2 are connected to the engine controller 10. The engine controller 10 is adapted to send and receive signals to and from the other controller (not shown) in the vehicle. Based on input signals from these sensors and other controller, the engine controller 10 performs opening control of the throttle valve 6, control of the amount and timing of fuel injection by a fuel injection valve (not shown), control of the timing of ignition by a spark plug (not shown) and exhaust gas recirculation control by the exhaust gas recirculation control valve 9, and the like.

As illustrated, the internal combustion engine 1 of the present embodiment has a crank angle sensor 11 that outputs a pulse signal at every unit crank angle in association with rotation of a crankshaft; and the engine controller 10 carries out processing on the output signal of the crank angle sensor 11 to obtain an angle speed fluctuation, determines an indicated mean effective pressure fluctuation rate cPi based on the obtained angle speed fluctuation as an indicator representing combustion stability of the internal combustion engine, and then, corrects the target EGR rate based on the indicated mean effective pressure fluctuation rate cPi as will be explained later. Herein, the indicated mean effective pressure fluctuation rate cPi is a known indicator as disclosed in Japanese Laid-Open Patent Publication No. H9-14028, Japanese Laid-Open Patent Publication No. 2014-177911 etc. The higher the value of the indicated mean effective pressure fluctuation rate, the more unstable the combustion of the internal combustion engine. The indicated mean effective pressure fluctuation rate cPi is determined at each cycle as a moving average (or weighted average) using data for an adequate number of cycles (e.g. 100 cycles). As a technique for determining the combustion stability, there is also known a method using an in-cylinder pressure sensor. In the present invention, the indicator of combustion stability can be obtained with the use of the in-cylinder pressure sensor.

In the present embodiment, the internal combustion engine 1 is used in a series-hybrid vehicle. Although not specifically shown in the drawings, the series-hybrid vehicle generally includes: a power-generation motor generator that mainly functions as a generator; the internal combustion engine 1 used as an internal combustion engine for power generation to drive the power-generation motor generator according a power demand; a travelling motor generator that mainly functions as a motor to drive driving wheels of the vehicle; a battery that temporality stores power generated by the respective motor generators; and an inverter device that performs power conversion between the battery and the respective motor generators. The power generated by driving the power-generation motor generator with the internal combustion engine is stored in the battery through the invertor device. The traveling motor generator is driven and controlled by the power of the battery through the invertor device. The power generated by regeneration of the traveling motor generator is also stored in the battery through the invertor device.

In this series-hybrid vehicle, the internal combustion engine 1, which is used to drive the power-generation motor generator, is operated intermittently according to the power demand including the state of charge (SOC) of the battery. When the engine controller 10 receives the power demand from the vehicle-side controller in accordance with the accelerator pedal opening, vehicle travelling speed, SOC etc. of the vehicle, the internal combustion engine 1 is started in response to the power demand. The internal combustion engine 1 is stopped when the SOC reaches a predetermined level. As a consequence, the internal combustion engine 1 repeats start and stop events during operation of the vehicle. Under normal circumstances, the load and rotation speed of the internal combustion engine 1 are controlled in such a manner that the operation of the internal combustion engine 1 takes place within a specific operation region in the vicinity of an optimal fuel consumption point. Thus, the frequency of change of the operation point (rotation speed and load) is relatively low in the internal combustion engine 1 of the series-hybrid vehicle, as compared to the case where a vehicle is driven mechanically by output of an internal combustion engine.

Herein, the application of the present invention is not necessarily limited to the internal combustion engine of the series-hybrid vehicle. The present invention is widely applicable to internal combustion engines for mechanically driving vehicles.

Figure 2:
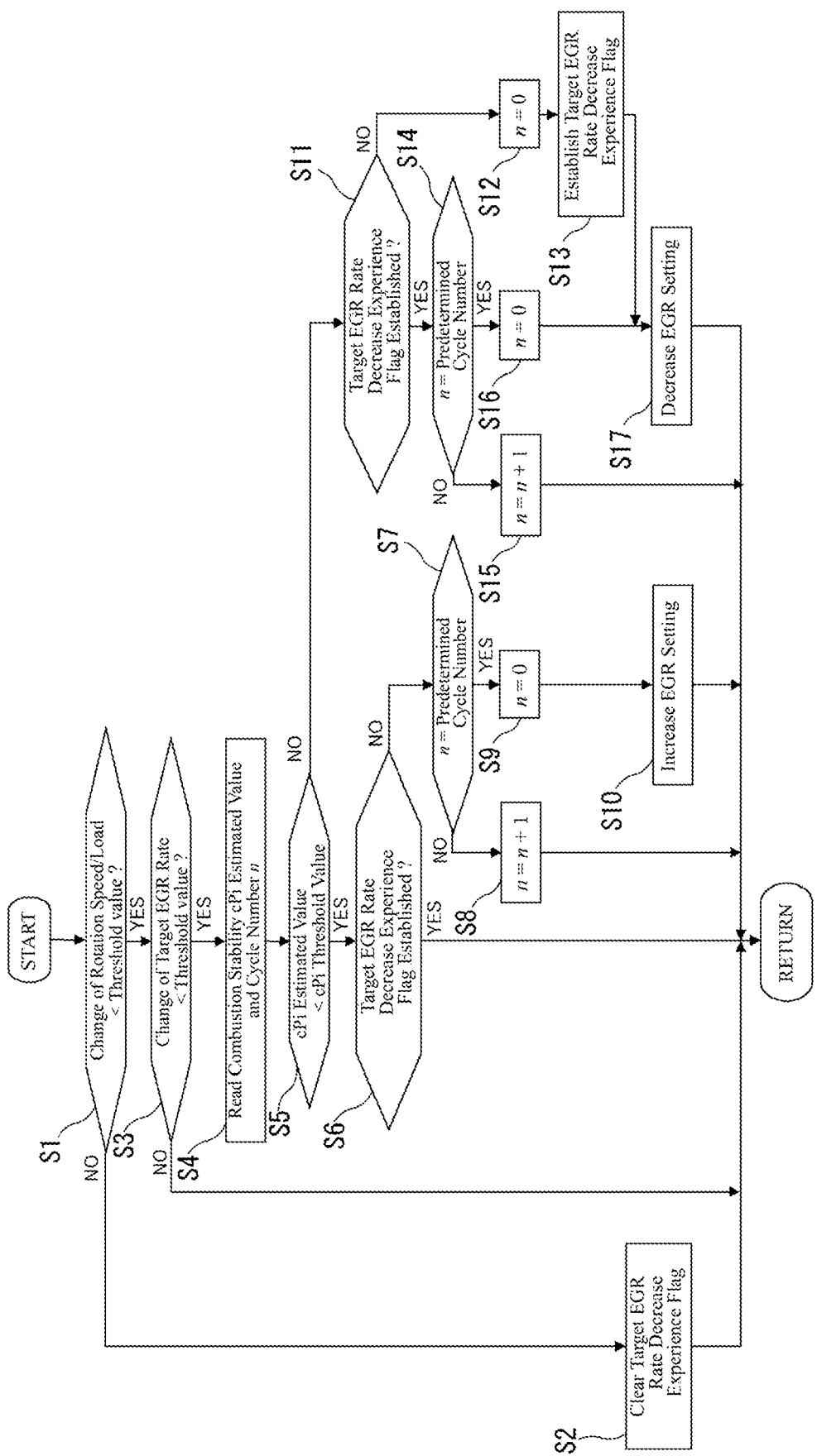
FIG. 2 is a flowchart for exhaust gas recirculation rate correction control according to one embodiment of the present invention.

FIG. 2 is a flowchart of processing for exhaust gas recirculation rate control according to one embodiment of the present invention. The routine shown in the flowchart is executed by the engine controller 10 repeatedly at each combustion cycle of the internal combustion engine 1. When the internal combustion engine 1 is a three-cylinder engine, for example, the routine of FIG. 2 is executed every 240° CA.

First, it is judged in step 1 whether the amounts of change of the rotation speed and load of the internal combustion engine 1 are smaller than respective threshold values. In other words, it is judged whether the operation point of the internal combustion engine 1 has changed or the internal combustion engine 1 is in a steady operation state. When the operation point has changed, the processing proceeds to step 2. In step 2, the target EGR rate decrease experience flag is cleared (i.e. set to 0). As will be explained later, the target EGR rate decrease experience flag is a flag representing whether the target EGR rate has experienced decrease correction in association with deterioration of the combustion stability, and is 0 at the time immediately after change of the operation point.

When YES in step 1, the processing proceeds to step 3. In step 3, it is judged whether the amount of change of the target EGR rate is smaller than a threshold value. In other words, it is judged whether it is immediately after the target EGR rate has changed by the amount greater than the threshold value. Herein, the change of the target EGR rate includes both of increase and decrease. The processing exits from the current routine when NO in step 3, i.e. when the target EGR rate has changed. Since the processing of step 3 is to exclude a transient state immediately after the change of the target EGR rate from the target of combustion stability judgment, NO judgement is made in this step during some time (adequate cycle number or time) after the target EGR rate has changed stepwise as shown in the after-mentioned time chart.

When YES in step 3, the processing proceeds to step 4. In step 4, the value of the indicated mean effective pressure fluctuation rate cPi as an indicator representing the combustion stability and the value of the counter n representing the number of cycles are read. The indicated mean effective pressure fluctuation rate cPi is herein determined as a moving average at each cycle through the execution of another routine.

Subsequently, it is judged by comparison of the indicated mean effective pressure fluctuation rate cPi with a predetermined threshold value in step 5 whether the indicated mean effective pressure fluctuation rate cPi is lower than the threshold value. When the indicated mean effective pressure fluctuation rate cPi is lower than the threshold value, the combustion stability is regarded as satisfying a predetermined level. In this case, the processing proceeds to step 6. In step 6, it is judged whether the target EGR rate decrease experience flag is 1 or not. The processing exits from the current routine when the target EGR rate decrease experience flag is 1.

The target EGR rate decrease experience flag is 0 immediately after the change of the operation point. In this case, the processing proceeds from step 6 to step 7. It is judged in step 7 whether the counter value n representing the number of cycles has reached a predetermined cycle number (e.g. 100 cycles). When NO in step 7, the processing proceeds to step 8. In step 8, the counter value n is incremented. Then, the processing exits from the routine. When the counter value n reached the predetermined cycle number, the processing proceeds to step 9. In step 9, the counter value n is reset to zero. Then, the processing proceeds to step 10. In step 10, the target EGR rate is increase-corrected by a relatively small, predetermined amount. In the present embodiment, a reference target EGR rate is preset for each operation point; and the target EGR rate is increased by a predetermined correction amount with respect to the reference target EGR rate in step 10.

As mentioned above, the target EGR rate is increase-corrected by the predetermined amount at the time when it is judged through steps 5, 6 and 7 that the number of combustion cycles reaches the predetermined cycle number during continuation of the state where the indicated mean effective pressure fluctuation rate cPi is lower than the threshold value. Further, the counter value n is reset when the number of combustion cycles reaches the predetermined cycle number. This correction control allows, when the state where the indicated mean effective pressure fluctuation rate cPi is lower than the threshold value continues for a long time, the target EGR rate to be increase-corrected by the predetermined amount at every lapse of the predetermined cycle number.

On the other hand, the combustion stability is regarded as lower than the predetermined level when it is judged in step 5 that the indicated mean effective pressure fluctuation rate cPi is higher than or equal to the threshold value. In this case, the processing proceeds from step 5 to step 11. In step 11, it is judged whether the target EGR rate decrease experience flag is 1 or not. The target EGR rate decrease experience flag is 0 immediately after the change of the operation point. When the target EGR rate decrease experience flag is 0, the processing proceeds from step 11 to step 12. The counter value n is reset to zero in step 12. Subsequently, the target EGR rate decrease experience flag is set to 1 in step 13. Then, the processing proceeds from step 13 to step 17. In step 17, the target EGR rate is decrease-corrected by a predetermined amount. This correction control allows, when the indicated mean effective pressure fluctuation rate cPi is higher than or equal to the threshold value in a certain combustion cycle, the target EGR rate to be decrease-corrected immediately without waiting for a lapse of the predetermined cycle number.

It is assumed that the target EGR rate decrease experience flag is set to 1 in step 13. When the indicated mean effective pressure fluctuation rate cPi is judged as being higher than or equal to the threshold value in step 5 of the next routine, the judgment of the target EGR rate decrease experience flag in step 11 becomes YES. In this case, the processing proceeds from step 11 to step 14. It is judged in step 14 whether the counter value a representing the number of combustion cycles has reached a predetermined cycle number (e.g. 100 cycles). When NO in step 14, the processing proceeds to step 15. The counter value n is incremented in step 15. Then, the processing exits from the routine. When the counter value n has reached the predetermined cycle number, the counter value a is reset to zero in step 16. The control then proceeds to step 17. In step 17, the target EGR rate is decrease-corrected by a relatively small predetermined amount.

In other words, the target EGR rate decrease experience flag is set to 1 in step 13 when the target EGR rate is decrease-corrected in step 17 under the condition that the indicated mean effective pressure fluctuation rate cPi becomes higher than or equal to the threshold value. After that, the decrease correction of the target EGR rate is not performed even when the indicated mean effective pressure fluctuation rate cPi becomes higher than or equal to the threshold value. The decrease correction of the target EGR rate is again performed when the state where the indicated mean effective pressure fluctuation rate cPi is higher than or equal to the threshold value continues for the predetermined cycle number. Further, the target FOR rate is decrease-corrected at every lapse of the predetermined cycle number when the state where the indicated mean effective pressure fluctuation rate cPi is higher than or equal to the threshold value continues for a long time.

FIG. 3 is a timing chart of operations under the above-mentioned correction control of the target EGR rate. In the figure, (a) the steady state judgment, (b) the indicated mean effective pressure fluctuation rate cPi, (c) the EGR rate correction amount and (d) the target EGR rate decrease experience flag are shown in this order from the top. The pulse waveform of (a) the steady state judgement indicates whether or not the engine rotation speed, load and EGR rate are in a steady state based on the combination of the judgments of steps 1 and 2. The rising timing of the pulse waveform of (a) the steady state judgement corresponds to the timing of shift from step 3 to step 4 in the flowchart of FIG. 2.

In the present embodiment example, the indicated mean effective pressure fluctuation rate cPi is lower than the predetermined threshold value during the period until time t5, becomes higher than or equal to the threshold value for a while from time t5, and then, again becomes lower than the threshold value.

Consequently, the processing of steps 5, 6, 7 and 8 of FIG. 2 is repeatedly executed from time t1 in the present embodiment example. This state continues for the predetermined cycle number until time t2. At time t2, the target EGR rate is increase-corrected by the predetermined amount as shown in (c) of the figure. By such increase correction, the judgment of step 3 of FIG. 2 becomes NO. After a slight delay, the processing of steps 5, 6, 7 and 8 is repeatedly executed from time t3. This state continues for the predetermined cycle number until time t4. At time t4, the target EGR rate is further increase-corrected by the predetermined amount as shown in (c) of the figure. In other words, the target EGR rate is increased stepwisely at every lapse of the predetermined cycle number during continuation of the state where the indicated mean effective pressure fluctuation rate cPi is lower than the predetermined threshold value. There is a delay until the change of the target EGR rate is reflected in the indicated mean effective pressure fluctuation rate cPi. It is thus possible by performing the next increase correction after waiting for a lapse of the predetermined cycle number to correct the EGR rate nearly to its limit while avoiding deterioration of combustion caused due to sudden increase of the EGR rate. Especially in the case where the indicated mean effective pressure fluctuation rate cPi is determined as the moving average, the combustion stability under the increase-corrected EGR rate cannot be obtained correctly because the influence of the combustion state in the slightly previous cycles (i.e. the cycles in which the FOR rate is still low) remains. It is however possible to avoid sudden deterioration of the combustion state by performing the next increase correction after waiting for the lapse of the predetermined cycle number.

Since such increase of the EGR rate results in deterioration of the combustion stability, the indicated mean effective pressure fluctuation rate cPi becomes higher than or equal to the threshold value in the course of time. In the present embodiment example, the indicated mean effective pressure fluctuation rate cPi becomes higher than or equal to the threshold value at time t5 as illustrated. At this time, the target EGR rate is immediately decrease-corrected through the processing of steps 5, 11, 12, 13 and 17 of FIG. 2. Simultaneously, the target EGR rate decrease experience flag is set to 1 through the processing of step 13. In other words, the target EGR rate is immediately decreased, without waiting for a lapse of the predetermined cycle number, when the indicated mean effective pressure fluctuation rate cPi becomes higher than or equal to the threshold value under the condition that the target EGR rate decrease experience flag is 0. By such decrease correction, it is possible to prevent the deteriorated combustion state from continuing for a long time.

When the target EGR rate is decrease-corrected at time t5, the processing proceeds from step 3 to step 4 and subsequent steps of FIG. 2 at time t6 after a slight delay during which the operation state is judged as a transient state. The indicated mean effective pressure fluctuation rate cPi is higher than or equal to the threshold value at time t6. At this time, however, the target EGR rate decrease experience flag is 1. Hence, the processing proceeds from step 11 to step 14 and subsequent steps. The target EGR rate is therefore not decrease-corrected at the point of time t6. When the state where the indicated mean effective pressure fluctuation rate cPi is higher than or equal to the threshold value continues for the predetermined cycle number, the target EGR rate is again decrease-corrected at time t7. By performing the second or subsequent decrease correction after waiting for a lapse of the predetermined cycle number as mentioned above, it is possible to suppress the decrease of the target EGR rate to its minimum. This eliminates the influence of the cycles in which the EGR rate has been still high before time t5.

In the present embodiment example, the combustion stability is improved as illustrated when the decrease correction of the target EGR rate is performed two times. The indicated mean effective pressure fluctuation rate cPi is lower than the threshold value at time t8. Further, the state where the indicated mean effective pressure fluctuation rate cPi is lower than the threshold value continues for the predetermined cycle number until time t9. At this time, however, the target EGR rate decrease experience flag is 1. Accordingly, the increase correction of the target EGR rate is prohibited. In other words, the correction of the target EGR rate is not performed when the routine ends through the processing of step 6 of FIG. 2. This prevents, since deterioration of the combustion state has actually occurred by increase of the EGR rate at the same operation point (engine rotation speed and load), deterioration of the combustion state from occurring by further increase of the EGR rate.

As mentioned above, the target EGR rate decrease experience flag is set to 0 in response to the change of the operation point. It is thus possible in the present embodiment to, as long as the operation point remains the same, prevent deterioration of the combustion state caused due to unnecessary increase of the EGR rate.

In the illustrated embodiment example, the correction amount of the FOR rate under the increase correction and the correction amount of the FOR rate under the decrease correction are shown to be equal to each other for simplification purposes. Alternatively, the correction amount under the increase correction and the correction amount under the decrease correction may be set different from each other. Further, the correction amount under the initial decrease correction may be set different from those under the second or subsequent decrease correction. For example, it is feasible to set the initial decrease correction amount to a large value.

Furthermore, the predetermined cycle number used for increase correction of the target EGR rate and the predetermined cycle number used for decrease correction of the target FOR rate are not necessarily the same. Similarly, these cycle numbers may be different from the cycle number used for determination of the indicated mean effective pressure fluctuation rate cPi as the moving average. In one embodiment example, the predetermined cycle number for increase correction and the predetermined cycle number for decrease correction are set equal to each other and are set substantially equal to the cycle number used for determination of the indicated mean effective pressure fluctuation rate cPi as the moving average.

The invention claimed is:

1. A control method for an internal combustion engine, comprising:
 obtaining an indicator representing combustion stability of the internal combustion engine; and
 correcting an exhaust gas recirculation rate based on the combustion stability,
 wherein, when the combustion stability satisfies a predetermined level, the exhaust gas recirculation rate is increase-corrected by a predetermined amount at every lapse of a predetermined cycle number, and
 wherein the exhaust gas recirculation rate is decrease-corrected immediately when the combustion stability is detected as being lower than the predetermined level, and
 wherein, during a time at which the internal combustion engine remains at a certain operation point, the increase correction of the exhaust gas recirculation rate based on the combustion stability is prohibited from being performed at the certain operation point when the decrease correction of the exhaust gas recirculation rate based on the combustion stability has been performed.

2. The control method for the internal combustion engine according to claim 1, wherein, when a state where the combustion stability is lower than the predetermined level continues for a predetermined cycle number after the exhaust gas recirculation rate has been decrease-corrected by a predetermined amount, the exhaust gas recirculation rate is further decrease-corrected by the predetermined amount.

3. The control method for the internal combustion engine according to claim 1, wherein the correcting includes:
 judging whether the combustion stability satisfies the predetermined level at every cycle;
 increase-correcting the exhaust gas recirculation rate by a predetermined amount when cycles in which the combustion stability satisfies the predetermined level continue for a predetermined cycle number;

when the combustion stability does not satisfy the predetermined level in a certain cycle, immediately decrease-correcting the exhaust gas recirculation rate by a predetermined amount; and after the decrease-correcting, when cycles in which the combustion stability does not satisfy the predetermined level continue for a predetermined cycle number, further decrease-correcting the exhaust gas recirculation rate by the predetermined amount.

4. A control device for an internal combustion engine, comprising:
- an exhaust gas recirculation unit equipped with an exhaust gas recirculation control valve;
- at least one sensor that detects a rotation fluctuation or in-cylinder pressure associated with combustion stability of the internal combustion engine; and
- a controller that corrects an exhaust gas recirculation rate of the exhaust gas recirculation unit based on the combustion stability, wherein the controller is configured to:

when the combustion stability satisfies a predetermined level, increase-correct the exhaust gas recirculation rate by a predetermined amount at every lapse of a predetermined cycle number; and decrease-correct the exhaust gas recirculation rate immediately when the combustion stability is detected as being lower than the predetermined level; and wherein the controller is further configured to, during a time at which the internal combustion engine remains at a certain operation point, prohibit the increase correction of the exhaust gas recirculation rate based on the combustion stability from being performed at the certain operation point when the decrease correction of the exhaust gas recirculation rate based on the combustion stability has been performed.

* * * * *